Figure 1:
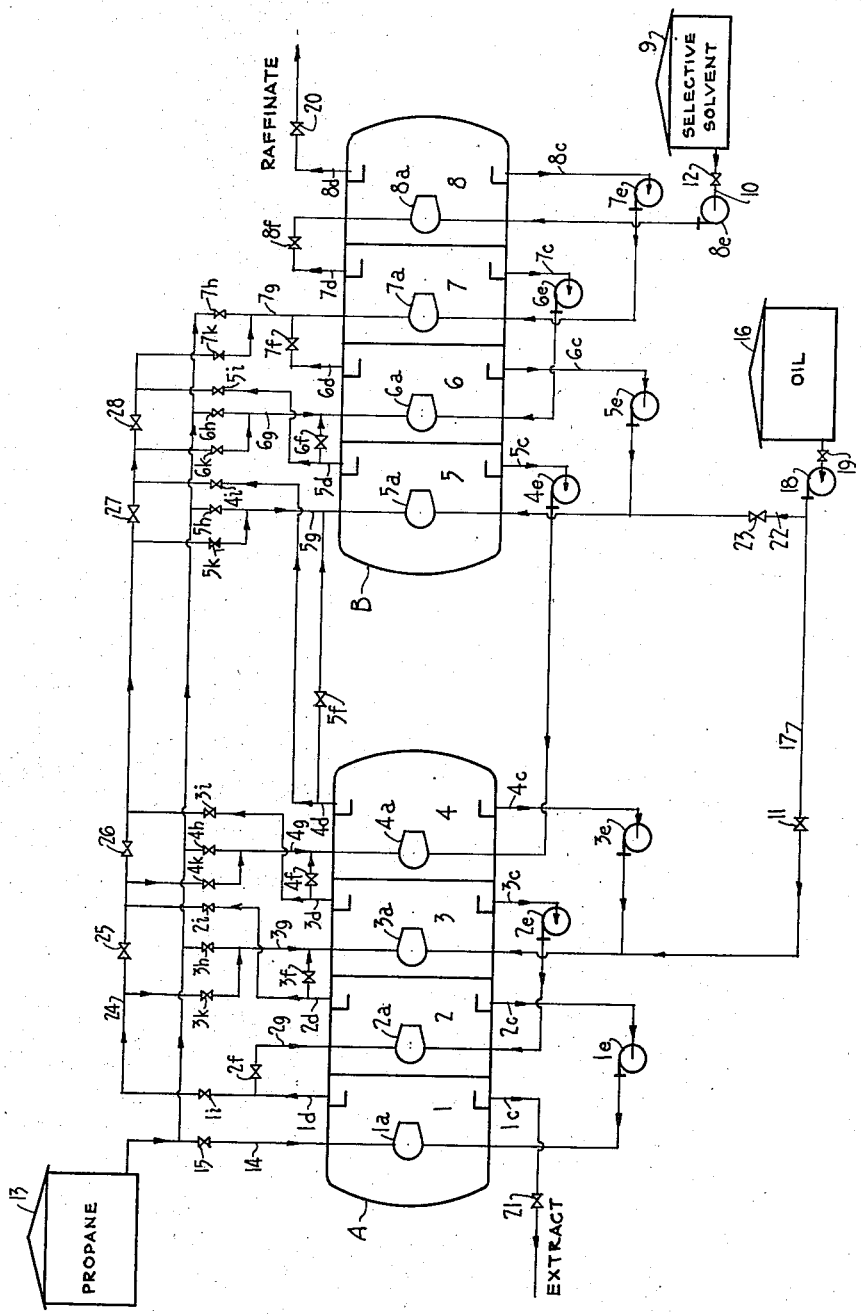

Dec. 17, 1940.  A. P. ANDERSON  2,225,396
EXTRACTION PROCESS
Filed March 1, 1937  2 Sheets-Sheet 1

INVENTOR: Alvin P. Anderson
By His Attorney:

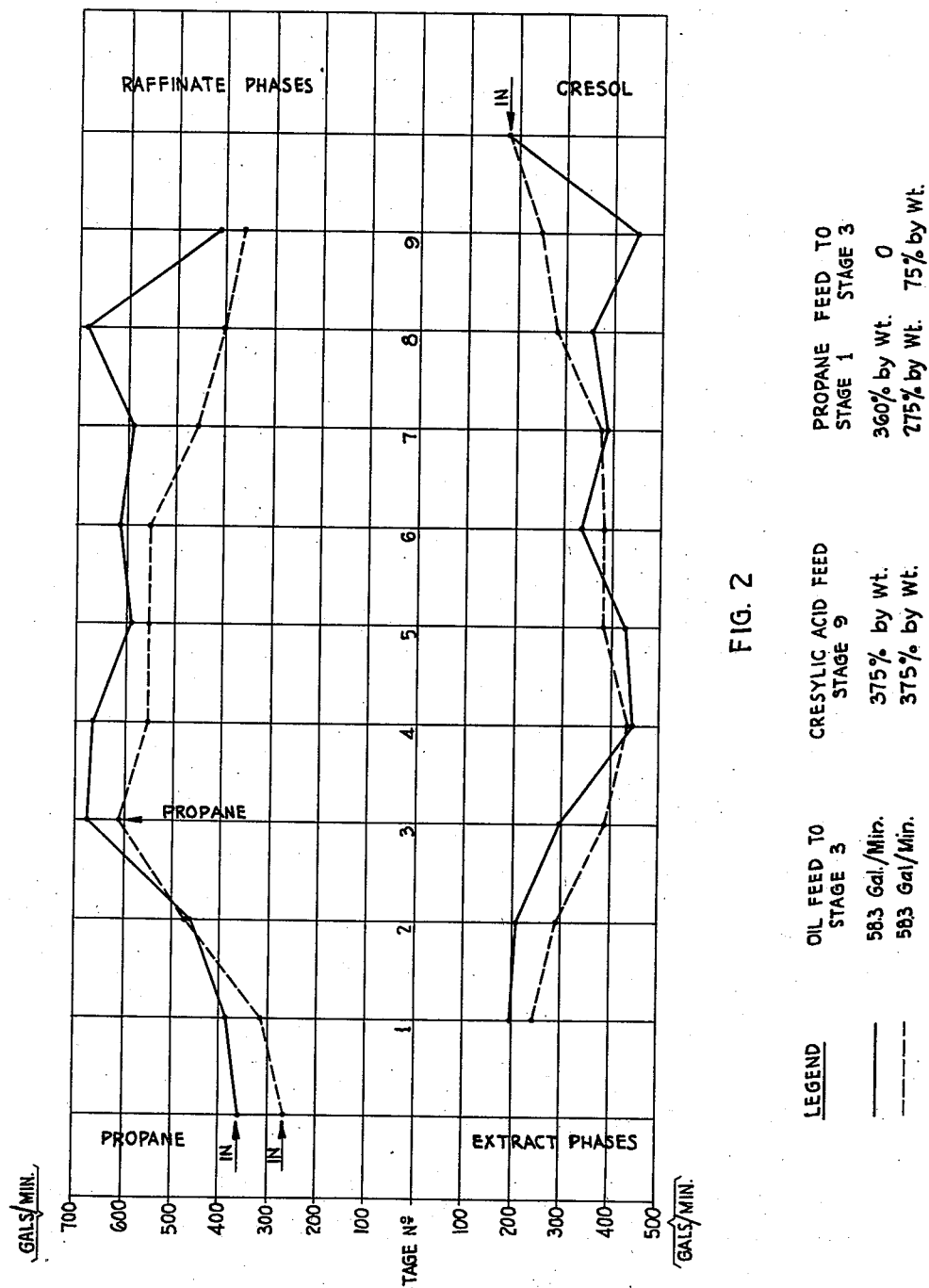

Patented Dec. 17, 1940

2,225,396

UNITED STATES PATENT OFFICE 2,225,396

EXTRACTION PROCESS

Alvin P. Anderson, Alton, Ill., assignor to Shell Development Company, San Francisco, Calif., a corporation of Delaware Application March 1, 1937, Serial No. 128,393

3 Claims. (Cl. 196—13)

This invention relates to a process for the treatment of hydrocarbon mixtures, such as petroleum fractions with selective solvents, and is useful in the treatment of distillates or residues, such as cylinder oil, lubricating oil, spindle oil, transformer oil, solar oil, and lower boiling hydrocarbon distillates, to effect a separation between various types of hydrocarbons.

The types of hydrocarbons occurring in petroleum fractions and their relative concentrations vary with the source and the boiling range of the fraction, and these variations in initial composition, as well as the quality of the desired extraction product, determine the exact nature of the separation effected in extraction processes. In general, it is the purpose to dissolve in the selective solvent those components of the initial oil which are more aromatic, naphthenic, and/or olefinic in nature, while leaving undissolved the relatively more paraffinic components. In the case of lubricating oils, the more paraffinic hydrocarbons present in crude lubricating oil fractions are more desirable because, as compared with the hydrocarbons which are more soluble in polar selective solvents of the type of cresylic acid, their viscosity is not so greatly affected by changes in temperature, are chemically more inert and stable, and exhibit less tendency towards the formation of undesirable resinous or sludge forming constituents on contact with air at elevated temperatures. This group of hydrocarbons, in the case of lubricating oils, does not include those compounds which are solid or semi-solid at ordinary temperature, and usually designated as "wax" or "petrolatum."

As a matter of convenience hereafter the component or group of components of the initial mixture which it is desired to remove in the extraction process by preferential dissolution in the selective solvent as the extract will be designated "non-paraffinic" constituents, and the component or group of components which it is desired to recover as the raffinate will be designated as "paraffinic," it being understood that these terms are relative, and are to be interpreted with regard to the composition of the initial material and the extraction products produced, the "non-paraffinic" portion being in each case more readily soluble in the solvent than the "paraffinic" portion.

A number of selective solvents for extracting hydrocarbon mixtures is known. These solvents are highly polar, and are partially immiscible with the initial oil under the extracting conditions in the presence of liquid low molecular paraffinic solvents described below, causing the formation of two strata of different specific gravities; the one having a relatively higher concentration of selective solvent is designated as the extract phase, and the other the raffinate phase. The distribution ratio of the non-paraffinic component(s) between the extract and raffinate phases is always greater than the corresponding ratio for the paraffinic component(s). Representative examples of such solvents are liquid sulfur dioxide, cresylic acid, BB' dichloroethyl ether, furfural, quinoline, phenol, nitrobenzene, ortho chloraniline, aniline, their mixtures, either alone or diluted with non-selective solvent, particularly low-boiling aromatic diluents, such as benzol, toluol, poly-cyclic aromatic hydrocarbons, and kerosene extract.

According to a preferred mode of carrying out such an extraction process, the selective solvent is flowed through a packed tower or multi-stage treater countercurrently to an auxiliary solvent, such as a low-boiling liquid or liquefied paraffinic hydrocarbon, which is at least partially immiscible with the selective solvent in the presence of the mixture to be extracted, and the initial mixture is introduced into the system at a point intermediate the point of introduction of the selective solvent and the removal of the raffinate phase, and the point of introduction of the auxiliary solvent and the removal of the extract phase. Such a process is commonly known as a "duosol" process and is described in the United States patents to van Dijck, No. 2,023,109 and Tuttle No. 1,912,349. Particularly useful as an auxiliary solvent are liquid or liquefied hydrocarbon distillates boiling below about 45° C., although higher boiling preferably aromatic-free distillates may often be employed. Specifically, it has been found that liquefied propane, either alone, or in admixture with lesser amounts of methane, ethane, and butane is an excellent auxiliary solvent, but higher aliphatic solvents such as butanes and pentanes are also suitable, especially iso-butane and 2-methyl butane.

The quantity of the raffinate which can be produced in an extraction unit in a given time depends upon the rapidity with which the raffinate and extract phases can be parted and fed into the next stages. It was found that when operating the duosol process in an apparatus having several stages arranged for the countercurrent flow of two liquids (which stages may be either real, as when a series of interconnected mixers and settlers or centrifuges is provided, or virtual, as when using one or more packed towers), the maximum rate of throughput of the mixture to be extracted is limited by the speed and degree of separation of the phases. Thus, when feeding too much of the initial mixture into the process, the mixture in one or more stages (generally in a stage near the point of introduction of the feed, toward the point of removal of the raffinate) may fail to settle in a reasonable time, causing some of the extract phase to move in the wrong direction, decreasing the sharpness of the extraction; this condition frequently progresses so far as eventually to result in the coalescence of the two phases with the result that the extraction zone is flooded with a solution of oil and solvents and the extraction ceases. It was found to be desirable to operate an apparatus comprising mixers and settlers under conditions producing raffinate and extract phases in the last stage differing from one another by at least 0.23 specific gravity unit. As the throughput of oil is increased it is desirable to increase this difference to 0.28 unit.

Since the auxiliary solvent decreases the density of the raffinate phase, lowers the solubility of certain non-paraffinic components in the raffinate oil, and improves the formation and separation of the isotonic raffinate and extract phases in the several stages of the process, being, in fact, often indispensable to cause phase separation, a certain improvement in the speed of the partition of the phases between the points of introduction of the feed and the selective solvent can be obtained by increasing the ratio of the auxiliary solvent to the initial oil by lowering the rate of feed of the oil (which is economically undesirable) and/or by introducing more auxiliary solvent into the process. An increase in the quantity of the auxiliary solvent introduced at the extreme stage of the process beyond a certain value is, however, not practical because it often prevents phase separation in the stages between the points of introduction of the feed and the selective solvent. This is particularly the case when extracting oils initially having a viscosity index above 50, and is believed to be due to the presence of components having solubilities intermediate to the components of high and low solubility in the selective solvent employed, which intermediate components are, in consequence of the use of a large volume of auxiliary solvent, washed out of the extract phase and carried by the auxiliary solvent away from its point of introduction but, being also readily soluble in the selective solvent, are likewise washed out of the raffinate phase by the selective solvent, and carried by the latter away from its point of introduction. As a result of these converging streams, the concentration of the intermediate component(s), which is (are) soluble in both phases, is abnormally increased in intermediate stages, with the result that the raffinate and extract phases tend to become more readily miscible. This condition may be referred to as "flooding". Another result of the introduction of a large quantity of auxiliary solvent into the system at the point of removal of the extract phase is that it upsets the desired relation between the size of the liquid phases in the apparatus, since it excessively increases the size of the raffinate phase present in the deraffinating stages of the process, i. e., in the stages between the point of introduction of the feed and the point of introduction of the auxiliary solvent; this condition hinders and may even prevent the desired formation of two phases, and interferes with the countercurrent flow of the phases, since the level of the interphase in the settler drops, and, if the rate of efflux of extract phase is not lowered, portions of the raffinate phase are flowed with or in place of the extract phase. A lowering of the rate of flow of the extract phase, is, however, undesirable.

It is an object of the present invention to operate a duosol extraction process of the type described in the United States Patents Nos. 1,912,349 and 2,023,109 in a more effective manner, whereby the quantity of oil which may be extracted in a given apparatus can be increased.

It is a further object to maintain in the stages between the inlets of the feed and the auxiliary solvent such a proportion of the auxiliary solvent to oil, that the desired quantity relationship between extract and raffinate is maintained and extraction mixtures in the apparatus are readily separated, while yet employing the necessary quantity of auxiliary solvent in the composite extraction process to prevent flooding and effect a speedy and improved separation of the phases in the extraction stages between the inlets of the feed and the selective solvent.

With these and other objects in view, which will be apparent from a reading of the specification, the present invention comprises certain novel methods of contacting selective and auxiliary solvents with hydrocarbon mixtures, and certain novel combinations of steps, as more specifically described in this specification, illustrated in the accompanying drawings, and defined in the claims, it being understood that the particular disclosure made in the specification and drawings is exemplary only.

In the drawings, Figure 1 is a schematic flow diagram of one form of apparatus suitable for practicing my invention, and Figure 2 is a diagram indicating graphically the improvement obtainable by the use of the process according to the invention.

Referring to Figure 1, A and B represent cylindrical shells, fitted with a plurality of partitions so as to provide settling chambers or stages 1 to 8. Each stage is equipped with a mixing device 1a to 8a, which may be provided with means for distributing a liquid mixture or emulsion into the chambers with a minimum of turbulence, and with heat exchangers for regulating the temperature of the emulsion. The chambers are interconnected by conduits, as shown, and may be provided with gauges, heat exchangers, pumps, and other auxiliary equipment, not shown.

A selective solvent, such as cresylic acid or a mixture consisting of 65% cresylic acid and 35% phenol, or any other selective solvent for non-paraffines, enters mixer 8a from tank 9 via line 10 by the action of pump 8e through valve 12. An auxiliary solvent for the paraffinic hydrocarbons, such as liquid propane, is fed to mixer 1a from pressure tank 13 via line 14, controlled by valve 15. Raw oil, such as a topped crude, which may be unextracted or previously treated, and which may or may not have been de-asphalted and/or dewaxed, may enter one of the intermediate stages, such as, for example, stage 3 from tank 16 via line 17 and pump 18, at a rate controlled by valves 11 and 19.

As a result of feeding the selective solvent, propane, and initial oil into mixers 8a, 1a, and 3a, respectively, the selective solvent and propane flow countercurrently to one another through the several sections in the following manner: The phase mixture discharged from each of the mixers stratifies in the chambers 1 to 8 to form raffinate and extract phases. The extract phases, being in this specification assumed to be denser than the isotonic raffinate phases, settle to the bottoms of the chambers, and are withdrawn via lines 1c to 8c, while the raffinate phases are withdrawn via lines 1d to 8d. Extract phases from stages 2 to 8 are fed into mixers 1a to 7a, respectively, by pumps 1e to 7e, and raffinate phases from stages 1 to 7 are fed into mixers 2a to 8a, respectively, via valves 2f to 8f. The ultimate raffinate phase is withdrawn through valve 20, and may be treated for the recovery of the propane and selective solvent in any desired manner, as, for example, by a series of distilling operations, or by releasing the pressure to vaporize the propane, adding water to separate the selective solvent in an aqueous phase, and distilling to remove residual solvent. The final extract phase may be withdrawn through valve 21 in line 1c for a similar treatment.

The operation thus far described constitutes the duosol process as commonly practiced today. By way of illustrating the conditions, it may be stated that when using a mixture of 65% cresylic acid and 35% phenol, propane and a Mid-Continent residuum having a viscosity index of between 60 and 72, and operating at a uniform temperature of 55–90° F., for one hundred parts by weight of oil, there are fed between 250 and 350 parts of propane, and between 350 and 400 parts of cresylic acid. When a temperature gradient is employed, the temperature in stage 1 is lowest, and that in stage 8 highest.

When, in order to increase the throughput of the plant, for a given flow of selective solvent and propane, the rate of flow of the oil is increased, a difficulty in stratification in the chambers 4 to 8 is often experienced, because the emulsions formed in the mixers have too low a settling rate. It should be noted that the propane or other auxiliary solvent employed in this process performs two distinct functions: In the stages between the point of introduction of the feed and the point of introduction of the auxiliary solvent, i. e., in stages 1 and 2 (hereinafter collectively referred to as the "deraffinating zone") it acts as a solvent for paraffinic constituents of the oil which have been dissolved or entrained in the extract phase; in the remaining stages (hereinafter collectively referred to as the "elutrifying zone") it acts to decrease the solubility of non-paraffinic constituents in the raffinate oil, and aids or brings about the formation of two phases. It has been found, that when more auxiliary solvent is employed in the elutrifying zone the settling rate of the emulsion is increased, and a better separation is obtained. But, as was pointed out in the earlier part of this specification, it was found not to be practical to increase the flow of the auxiliary solvent into the mixer 1a because of flooding experienced in the elutrifying zone and difficulties in connecting with the sizes of the liquid phases experienced in the deraffinating zone and too much "stripping" in the deraffinating zone.

In accordance with the present invention the above difficulties are largely overcome and the capacity of the apparatus is increased by introducing auxiliary solvent into the mixer 1a, and by introducing into one or several mixers of the elutrifying zone a quantity of auxiliary solvent in excess of that which is normally carried into them with the raffinates from the adjacent stages.

This may be effected in two distinct ways, which may, however, be jointly applied in a single operation.

The first manner of practicing the present invention comprises feeding an added amount of auxiliary solvent from tank 13, or from a different source into one or more of the intermediate stages, e. g., into one or several of mixers 3a to 7a through lines 3g to 7g, controlled by valves 3h to 7h, respectively. When the auxiliary solvent introduced into the stages 3 to 7 is different from that introduced into the stage 1, it is preferable to employ one which is a better precipitant for aromatics than the solvent employed in the first stage. For example, when butane or iso-pentane is employed in the stage 1, liquid propane, a liquefied mixture of propane and ethane, or some other non-hydrocarbon precipitant, such as liquid carbon dioxide may be employed in the stages 3 to 7.

According to the preferred mode of practicing this embodiment of the invention, the added stream of auxiliary solvent is added into a stage of the elutrifying zone beyond the point of introduction of the feed, e. g., into mixer 5a, although good results were obtained when adding the auxiliary solvent to mixers 3a, 4a and/or 6a. If desired, the feed of initial oil may be divided into several streams, and a portion fed into each mixer receiving an added amount of auxiliary solvent. For example, when the added stream of auxiliary solvent is introduced into the stages 4 and 5 through the valves 4h and 5h, about 10 to 25% of the oil may be introduced into the mixer 5a through a line 22 and valve 23, the remaining quantity of oil being still fed into the mixer 3a.

By way of illustrating the improvement obtainable as a result of the above described embodiment of the invention, a nine stage countercurrent apparatus of the type illustrated, into which the feed was introduced at the third stage, (corresponding to the mixer 3a of the drawings) was operated using 300% by weight of propane and 375% by weight of cresyilc acid (based on the oil feed) at a temperature of 80 to 90° F., to extract deasphalted and dewaxed Mid-Continent residue. It was found that the rate of feed of oil could not be increased without causing cloudiness in the elutrification zone, and that the flow of propane into the first stage could not be increased because of flooding. When 200% by weight of propane were fed into the first stage, 100% into the fifth stage, and 65% into the sixth stage (a total of 365%), and using 375% by weight of cresylic acid, the rate of flow of oil could be increased by about 35%, without flooding.

The improvement obtainable by feeding a portion of the auxiliary solvent into the same stage as that receiving the feed of oil is indicated in Figure 2. In this figure the curves represent rates of flow of raffinate and extract phases, respectively, withdrawn from each of the stages of a nine stage duosol extraction plant of the type shown in Figure 1, the raffinate phase flowing under its own pressure, and the rate of discharge of extract phase being so regulated by the operation of the pumps 1e to 7e and the valve 21 as to maintain a constant level of the interphase level in the settling chambers. In these operations, 58.3 gallons per minute of a residual oil having an A. P. I. gravity of about 22 were introduced into the third stage of the system and 180 gallons per minute of cresylic acid (about 375% by weight) containing 35% phenol were introduced into the ninth stage.

The solid line indicates measurements obtained when the process was operated in the usual mode, i. e., by feeding 360% by weight of propane into the first stage.

The dotted line indicates measurements obtained when the process was operated in accordance with the present invention, i. e., by feeding 275% by weight of propane into the first stage, and an additional 75% by weight of propane into the third stage, together with the oil feed. It will be noted that smaller quantities of raffinate and extract phases were handled between stages. The size of the raffinate phase withdrawn from stages 3 to 9, and particularly from stages 7 and 8 was greatly reduced, a similar reduction in the volume of extract withdrawn from stages 8 and 9. Also, it should be noted that the dotted line is much smoother than the solid line.

These results show that in the usual operation a considerable amount of oil components having solubilities intermediate to those of the most paraffinic and least paraffinic components were shuttled back and forth, increasing the volume of the settling chambers required for efficient phase separation, and that this condition was greatly improved by operating the process in accordance with the present invention.

According to the second embodiment of the invention, the flow of auxiliary solvent into any stage, as, for example, the mixer 1a may be increased, and flooding prevented by flowing a portion of the raffinate phase into a non-adjacent stage in the direction of flow of the auxiliary solvent. Thus, valve 2f may be throttled, and a portion of the raffinate phase withdrawn via line 1d may be passed through valve 1i to a manifold 24 and fed into one or more of the mixers 3a to 7a through one or more valves 3k to 7k, respectively. Also, for example, one, several, or all of the valves 25 to 28 in the manifold 24 may be closed, and the raffinate from the first stage may be fed into the mixer 3a; and/or raffinate from the second stage, withdrawn through the valve 2i may be introduced into mixer 4a or 5a through the valve 4k or 5k, etc.

Good results are also obtained by introducing a portion of the initial feed and the by-passed raffinate phase into the same mixer. Thus, when, according to the preferred embodiment, raffinate phase from the stage 1 and/or 2 is introduced into the mixer 5a, a portion of the initial feed is also introduced into this mixer, as through a valve 22.

As pointed out above, both modes of increasing the concentration of auxiliary solvent in the system may be employed simultaneously. Thus, it is possible to introduce fresh auxiliary solvent into one or more intermediate stages through the lines 3g to 7g, and also by-pass raffinate phases via the manifold 24 in the manner described above.

This invention is particularly concerned with improving the operation of duosol-type processes in which, due to solubility characteristics of the solvents and oil involved, the feeding of the entire quantity of the auxiliary solvent to the extreme stage of the process results in the formation of substantially stable emulsions within the elutrifying zone. As seen from the foregoing, in order to improve such operation, the quantity of the auxiliary solvent used is divided, one portion is introduced into the stage producing the ultimate extract phase and passes through all subsequent extraction stages, and the other portion is added in one or more of the stages of the elutrifying zone, preferably just beyond the stage receiving the fresh oil.

While the invention has been described with particular reference to a propane-cresylic acid extraction process, it should be noted that it may be applied to any duosol process, and that numerous modifications may be effected in the process without departing from its spirit and scope. It is, for example, possible to employ diluents for the selective solvent; to operate at a uniform temperature or to maintain different temperatures in the successive stages; to return a portion of the final extracted oil, after its liberation from the solvent, into one or more stages.

The present invention is especially applicable to extraction processes in which an auxiliary solvent is necessary to cause phase separation in the elutrifying zone, i. e., in systems in which the selective solvent and the initial oil are not capable of forming two liquid phases at the operating temperature in the absence of the auxiliary solvent, but is useful in any situation in which the formation and separation of such liquid phases is improved by the presence of the auxiliary solvent.

I claim as my invention:

1. In a continuous duosol extraction process for separating a hydrocarbon oil into portions of different properties which comprises continuously introducing a selective solvent for non-paraffinic oil components into a multi-stage countercurrent extraction apparatus at a first point, continuously introducing auxiliary solvent for paraffinic components at a second point spaced from the first, said auxiliary solvent and selective solvent being adapted to form two liquid phases when mixed with said oil under the conditions of the process, counterflowing said solvents in the apparatus, introducing said hydrocarbon oil into the counterflowing solvents at a third point intermediate said first and second points, and removing said counterflowing solvents containing dissolved oil components at spaced points on either side of said third point, the improvement which comprises increasing the capacity of said apparatus by continuously withdrawing a portion of the auxiliary solvent phase from a stage near said second point and introducing it into a non-adjacent stage in the direction of flow of the auxiliary solvent phase and by introducing an added quantity of auxiliary solvent into the apparatus at at least one point intermediate to said first and second points.

2. The process according to claim 1 in which the added quantity of auxiliary solvent is introduced into the apparatus at at least one point intermediate to said first and second points, but not between said second and third points.

3. The process according to claim 1 in which the added quantity of auxiliary solvent contains a second auxiliary solvent which is different from the auxiliary solvent introduced at said second point and the second auxiliary solvent has a higher precipitating power for non-paraffinic components than the auxiliary solvent which is introduced at said second point.

ALVIN P. ANDERSON.